US009531620B2

(12) United States Patent
Ciodaru et al.

(10) Patent No.: US 9,531,620 B2
(45) Date of Patent: Dec. 27, 2016

(54) CONTROL PLANE PACKET TRAFFIC STATISTICS

(71) Applicant: Ixia, Calabasas, CA (US)

(72) Inventors: Florin Ciodaru, Simi Valley, CA (US); Sorin Fetche, Woodland Hills, CA (US); Narcis Abdulamit, Woodland Hills, CA (US); Anirban Majumder, Woodland Hills, CA (US); Gabriel Oprisan, Bucharest (RO)

(73) Assignee: Ixia, Calabasas, CA (US)

( * ) Notice: Subject to any disclaimer, the term of this patent is extended or adjusted under 35 U.S.C. 154(b) by 230 days.

(21) Appl. No.: 14/209,820

(22) Filed: Mar. 13, 2014

(65) Prior Publication Data

US 2014/0269390 A1      Sep. 18, 2014

Related U.S. Application Data

(60) Provisional application No. 61/789,909, filed on Mar. 15, 2013.

(51) Int. Cl.
*H04L 12/26* (2006.01)
*H04L 12/24* (2006.01)

(52) U.S. Cl.
CPC ............... *H04L 43/50* (2013.01); *H04L 41/08* (2013.01)

(58) Field of Classification Search
None
See application file for complete search history.

(56) References Cited

U.S. PATENT DOCUMENTS 9,007,922 B1 *   4/2015   Mittal ..................... H04L 43/50
                                                              370/242
2013/0083700 A1 *   4/2013   Sindhu ................ H04L 41/0843
                                                              370/255

* cited by examiner

*Primary Examiner* — Sulaiman Nooristany
(74) *Attorney, Agent, or Firm* — SoCal IP Law Group LLP; M. Kala Sarvaiya; Steven C. Sereboff

(57) ABSTRACT

There are disclosed methods and apparatus for displaying and viewing control plane statistical data for a network. The method comprises configuring a network configuration, wherein the network configuration comprises a network topology, a device group, and a device, generating a test to test the network under test, and requesting to display and view a statistical data based on a network configuration parameter.

12 Claims, 5 Drawing Sheets

CONTROL PLANE PACKET TRAFFIC STATISTICS

RELATED APPLICATION INFORMATION

This patent claims priority from the following provisional patent applications: U.S. Provisional Application No. 61/789,909 titled, "Control Plane Packet Traffic Statistics" filed on Mar. 15, 2013.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to viewing and displaying control plane packet traffic statistics.

Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module with the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple concurrent outgoing streams, for example to accommodate multiple packet types, rates, or destinations. "Simultaneous" means "at exactly the same time." "Concurrent" means "within the same time."

The test traffic may be divided into a plurality of "traffic items", where each traffic item is effectively a separate test from each other traffic item. Test traffic for some or all of a plurality of traffic items may be generated and transmitted concurrently. Each traffic items may include a plurality of streams, and each stream may typically be a portion of a single traffic item.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, a hardware "unit" also means a collection of hardware, which may be augmented by firmware and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

Throughout this description, elements appearing in block diagrams are assigned three-digit reference designators, where the most significant digit is the figure number where the element is introduced and the two least significant digits are specific to the element. An element that is not described in conjunction with a block diagram may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Description of Apparatus

Figure 1:
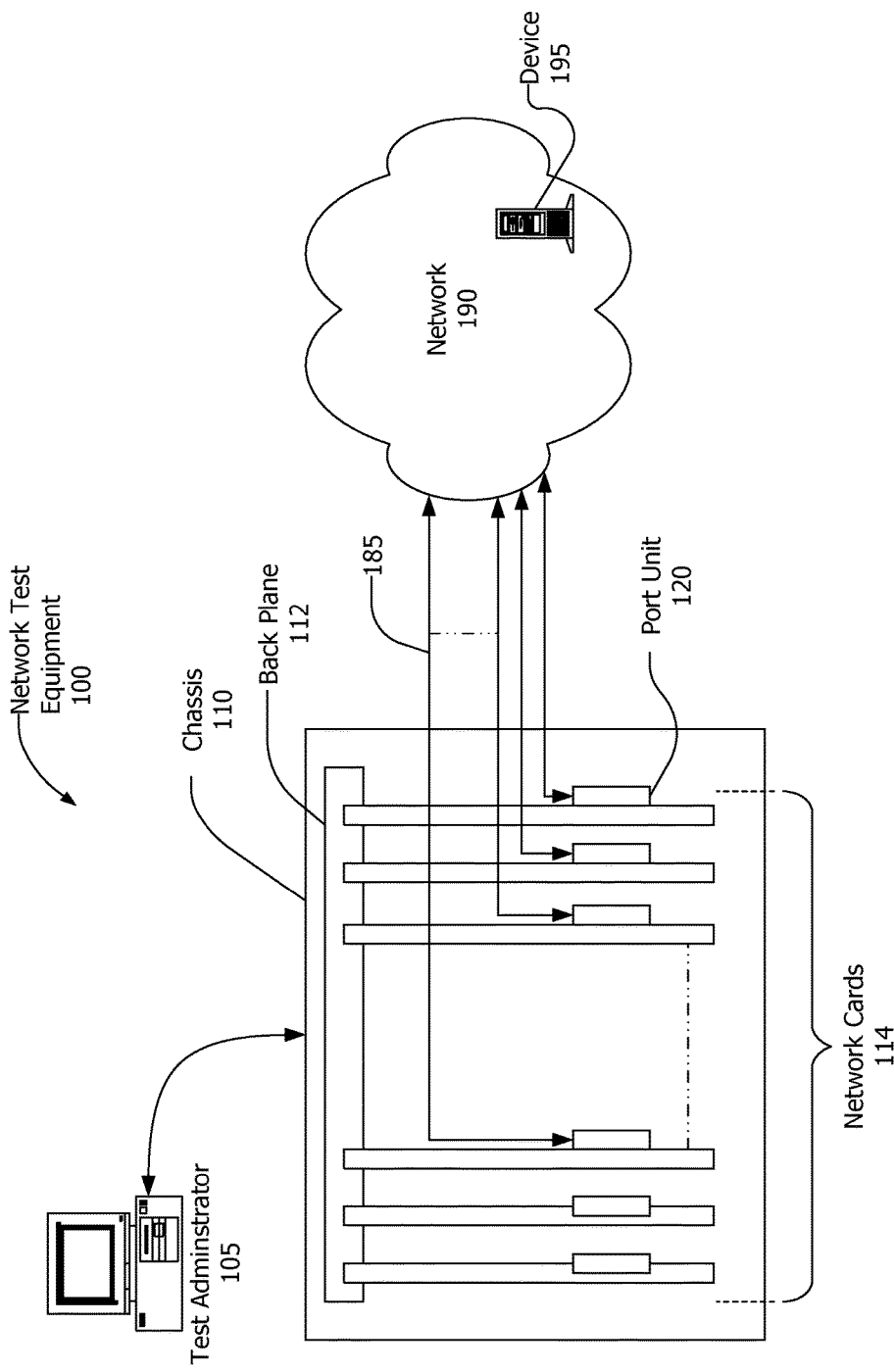
FIG. 1 is a block diagram of a network environment.

FIG. 1 shows a block diagram of a network environment. The environment may include network test equipment 100 and a network 190 which may include one or more network device 195.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may support a single communications protocol, may support a number of related protocols, or may support a number of unrelated protocols. The network cards 114 may be permanently installed in the network test equipment 100 or may be removable.

Each network card 114 may contain one or more port unit 120. One port unit or a plurality of port units may connect to the network 190 through respective ports. Each port may be connected to the network through a respective communication medium 185, which may be a wire, an optical fiber, a wireless link, or other communication medium. The communications media connecting the network to the plurality of port units may be the same or different. Each port unit 120 may generate and transmit test traffic to the network, and each port unit 120 may receive test traffic from the network. Packets transmitted by one of the port units 120 may commonly be received by one or more other port units.

The backplane 112 may serve as a bus or communications medium for the network cards 114. The backplane 112 may also provide power to the network cards 114.

The network test equipment may communicate with a test administrator 105. The test administrator 105 may be a computing device contained within, or external to, the network test equipment 100. The network test equipment may include an operator interface (not shown) for receiving test instructions from and displaying test results to an operator.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications paths between the network test equipment 100 and a given network device 195. The network itself may be comprised of numerous nodes providing numerous physical and logical paths for data to travel.

The network device 195 may be any devices capable of communicating over the network 190. The network devices 195 may include one or more of servers, network capable storage devices including disk drives such as network attached storage (NAS) and storage area network (SAN) devices, routers, relays, hubs, switches, bridges, multiplexers and other devices.

Figure 2:
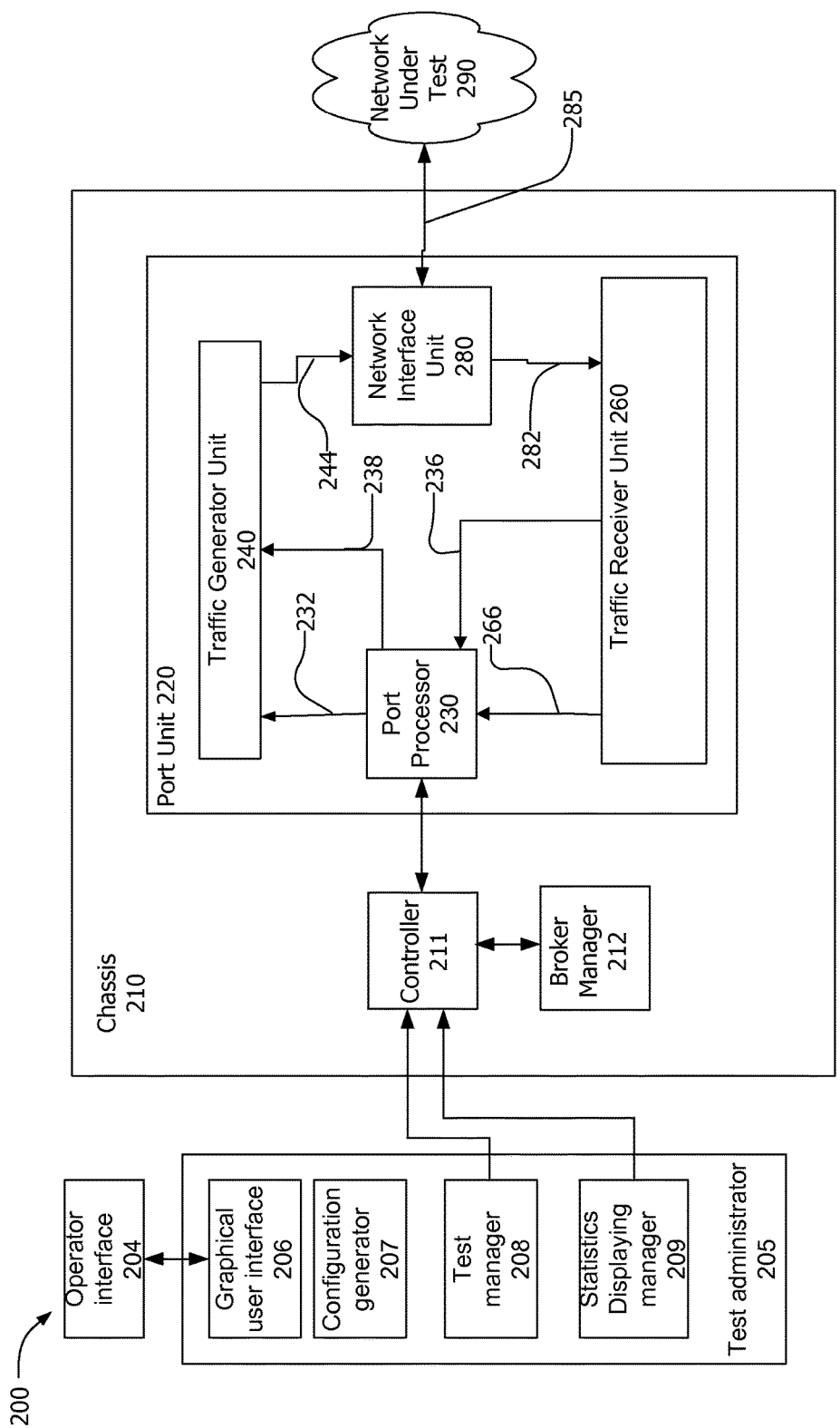
FIG. 2 is a block diagram of the network environment.

Referring now to FIG. 2, a test system 200, which may be the network test equipment 100 may include a test administrator 205 coupled to a chassis 210. The chassis 210 may include a controller 211, a broker manager 212, and a plurality of port units including an exemplary port unit 220.

The controller 211 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The controller 211 may manage system operations, such as statistics collection and reporting and network management.

The broker manager 212 matches publishers with subscribers so that they don't need to know about each other. Whenever a new publisher appears in the system, the publisher will communicate with the broker and get the active matching (interested in the statistics published by this publisher) subscribers and then the publisher will communicate directly to these subscribers. Similarly, whenever a new subscriber appears in the system, the subscriber will register with the broker and the broker will communicate with all matching publishers the details of the new subscriber.

When a test operator requests control plane statistical data, a new subscriber is created on the subscriber device that is interested in the requested control plane statistical data. The processes, functionality and features of the broker manager 212 may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port unit 220 may include a port central processor unit 230 (CPU), a traffic generator unit 240, a traffic receiver unit 260, and a network interface unit 280 which couples the port unit 220 to a network under test 290. The port unit 220 may be all or part of a network card such as the network cards 106.

The port CPU 230 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 230 may provide the traffic generator unit 240 with stream forming data 232 to form a plurality of streams. The stream forming data 232 may include, for example, the type of packet, the frequency of transmission, definitions of fixed and variable-content fields within the packet and other information for each packet stream. The traffic generator unit 240 may then generate the plurality of streams in accordance with the stream forming data 232. The plurality of streams may be interleaved to form outgoing traffic 244. Each of the streams may include a sequence of packets. The packets within each stream may be of the same general type but may vary in length and content.

The network interface unit 280 may convert the outgoing traffic 244 from the traffic generator unit 240 into the electrical, optical, or wireless signal format required to transmit the test traffic to the network under test 290 via a link 285. The link 285 may be a wire, an optical fiber, a wireless link, or other communication link. Similarly, the network interface unit 280 may receive electrical, optical, or wireless signals from the network over the link 285 and may convert the received signals into incoming traffic 232 in a format usable to the traffic receiver unit 260.

The traffic receiver unit 260 may receive the incoming traffic 242 from the network interface unit 280. The traffic receiver unit 260 may determine if each received packet is a member of a specific flow, and may accumulate test statistics for each flow in accordance with test instructions provided by the port CPU 230.

The traffic receiver unit 260 may capture and store specific packets in accordance with capture criteria included in test instructions. The traffic receiver unit 260 may provide test statistics and/or captured packets to the port CPU 230, in accordance with test instructions, for additional analysis during, or subsequent to, the test session.

Some amount of interactive communications may be required between the port unit 220 and the network under test 290 during a test session. The interactive communications may include, for example, TCP connections and application-layer transactions. Such traffic may be initiated, managed, and processed by the port CPU 230 and thus may be referred to as "CPU traffic". As shown in FIG. 2, the port CPU 230 may be coupled to the network interface unit 280 such that CPU traffic 266 may be communicated between the port CPU 260 and the network under test 290 via the network interface unit 240. Although not shown in FIG. 2, outgoing CPU traffic may be routed from the Port CPU 230 to the network interface unit 280 via the traffic generator unit 240, and incoming CPU traffic may be routed from the network interface unit to the port CPU via the traffic receiver unit 260.

The test administrator 205 may provide the port CPU 230 with instructions and data required for the port unit 220 to participate in testing the network 290. The instructions and data received from the test administrator 210 may include, for example, definitions of packet streams to be generated by the port unit 220 and definitions of performance statistics to be accumulated and reported by the port unit 220. The test administrator 205 may be coupled to or include an operator interface 218. The operator interface 204 may be used to receive commands and requests from an operator (not shown) and to present test data to the operator. The operator may be, for example, a test engineer or system operator who needs access to the test data.

The test administrator 205 may be a computing device connected to the port unit 220 via a bus, a network, or another communications path. The operator interface 204 may include at least one display device and one or more input devices such as a keyboard, a mouse or other pointing device, and/or a touch screen.

The hardware and software of the test administrator 205 may perform multiple functions including a graphical user interface 206, a configuration generator 207, a test manager 208, and a statistics displaying manager 208. The configuration generator 207 may configure and develop a network topology that includes device groups having various devices and using various protocols and ports. The configuration generator configures the network topology based, at least in part, on instructions and data received from a test engineer or other operator via the graphical user interface 206 and the operator interface 204. The configuration generator may also allow the test operator to configure test parameters to test the network under test. The test manager 208 may provide the port CPU 230 of each port unit 220 with instructions, parameters, and data required for each port unit to participate in testing the network under test 290 in accordance with the test configuration generated by the configuration generator 207. The instructions and data provided by the test manager 208 to each port unit 220 may include, for example, data enabling or disabling various capabilities and protocols, operational parameters, definitions of packet streams to be generated by the port unit and definitions of performance statistics to he accumulated by the port unit. For example, a user may configure a network topology that includes device groups, devices in those device groups, protocols the devices will use and ports that the devices will use. The test manager may provide this data to each port unit, so that each port unit knows the network topology, device group and the device to which the port unit belongs.

The outgoing test traffic 246 and the incoming test traffic 282 may be primarily stateless, which is to say that the outgoing test traffic 246 may be generated without expectation of any response and the incoming test traffic 282 may be received without any expectation of a response or intention of responding. However, some amount of stateful, or interactive, communications may be required or desired between the port unit 220 and the network 290 during a test session. For example, the traffic receiver unit 260 may receive control packets, which are packets containing data necessary to control the test session, that require the port unit to send an acknowledgement or response.

The traffic receiver unit 260 may separate incoming control packets 236 from the incoming test traffic and may route the incoming control packets 236 to the port processor 230. The port processor 230 may extract the content of each control packet and may generate an appropriate response in the form of one or more outgoing control packets 238. Outgoing control packets 238 may be provided to the traffic generator unit 240. The traffic generator unit 240 may insert the outgoing control packets into the outgoing test traffic 246.

In this patent, a port unit that generates and transmits traffic will be referred to as a source port unit. A port unit that receives traffic will be referred to as a destination port unit. A port unit connected to a network test may function as both a source port unit and a destination port unit.

Figure 3:
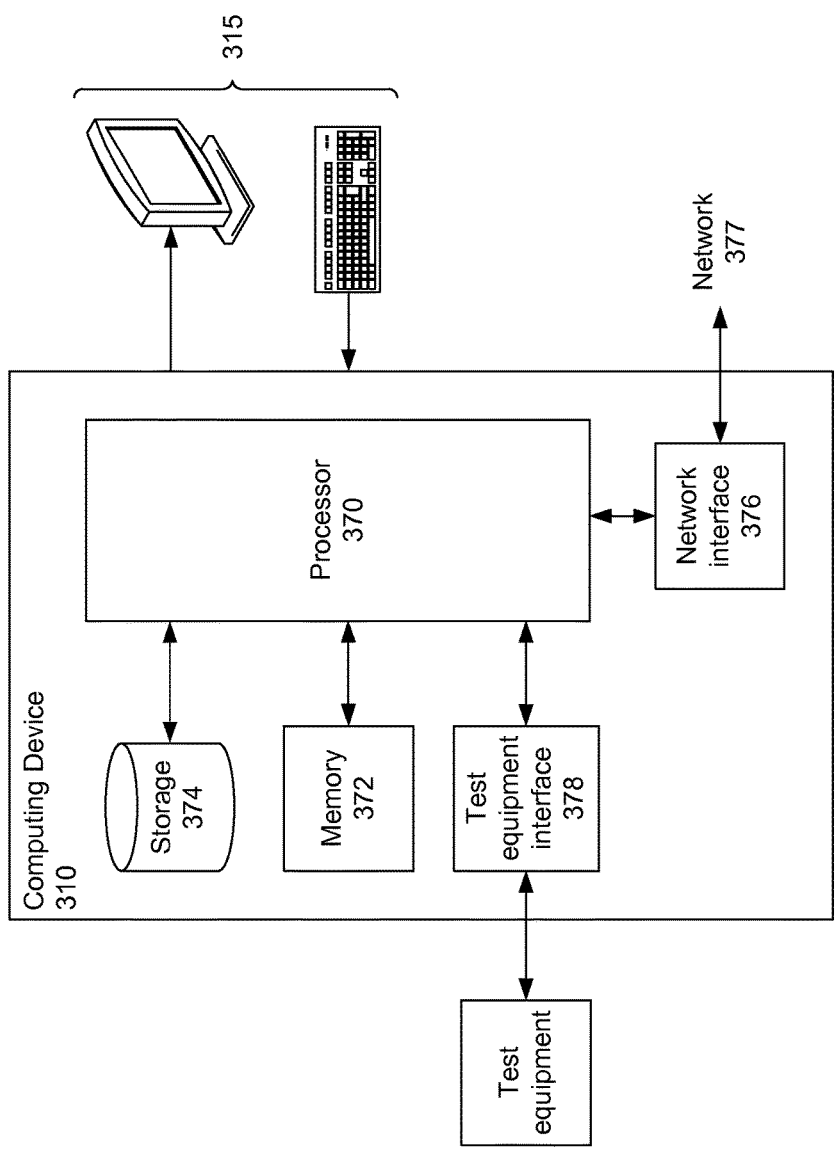
FIG. 3 is a block diagram of a computing device.

Referring now to FIG. 3, a computing device 310, which may be the test administrator 210, may include at least one processor 370 coupled to a memory 372. The processor 370 may be a single processor, multiple processors, or multiple processor cores within one or more processor circuit devices. The memory 372 may be static and/or dynamic random access memory or a combination of random access memory and other memory such as nonvolatile writable memory and read only memory. The memory 372 may temporarily or permanently store software instructions for execution by the processor 370 and data for use during the execution of those instructions.

The processor 370 may be coupled to a network 377, which may be or include the Internet, via a network interface 376. The processor 370 may be coupled to a user interface 315, which may includes a display and a keyboard and other devices that are not shown. The processor 370 may be configured to communicate with test equipment, such as the chassis 102 and network cards 106, via a test equipment interface 378.

The computing device 310 may execute an operating system, including, for example, variations of the Linux, Microsoft® Windows®, Symbian®, and Apple® Mac® operating systems. To access the Internet, the client computer may run a browser such as Microsoft® Explorer® or Mozilla® Firefox®, and an e-mail program such as Microsoft® Outlook® or Lotus Notes®. The computing device 310 may execute one or more application programs to perform the actions and methods described herein.

The operating system and/or application programs may be stored in the form of instructions on a machine readable storage medium within a storage device 374 coupled to the processor 370. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media.

Within this patent, the term "storage medium" refers to a physical object capable of storing data. The term "storage medium" does not encompass transitory media, such as propagating signals or waveforms.

Description of Processes

Figure 4:
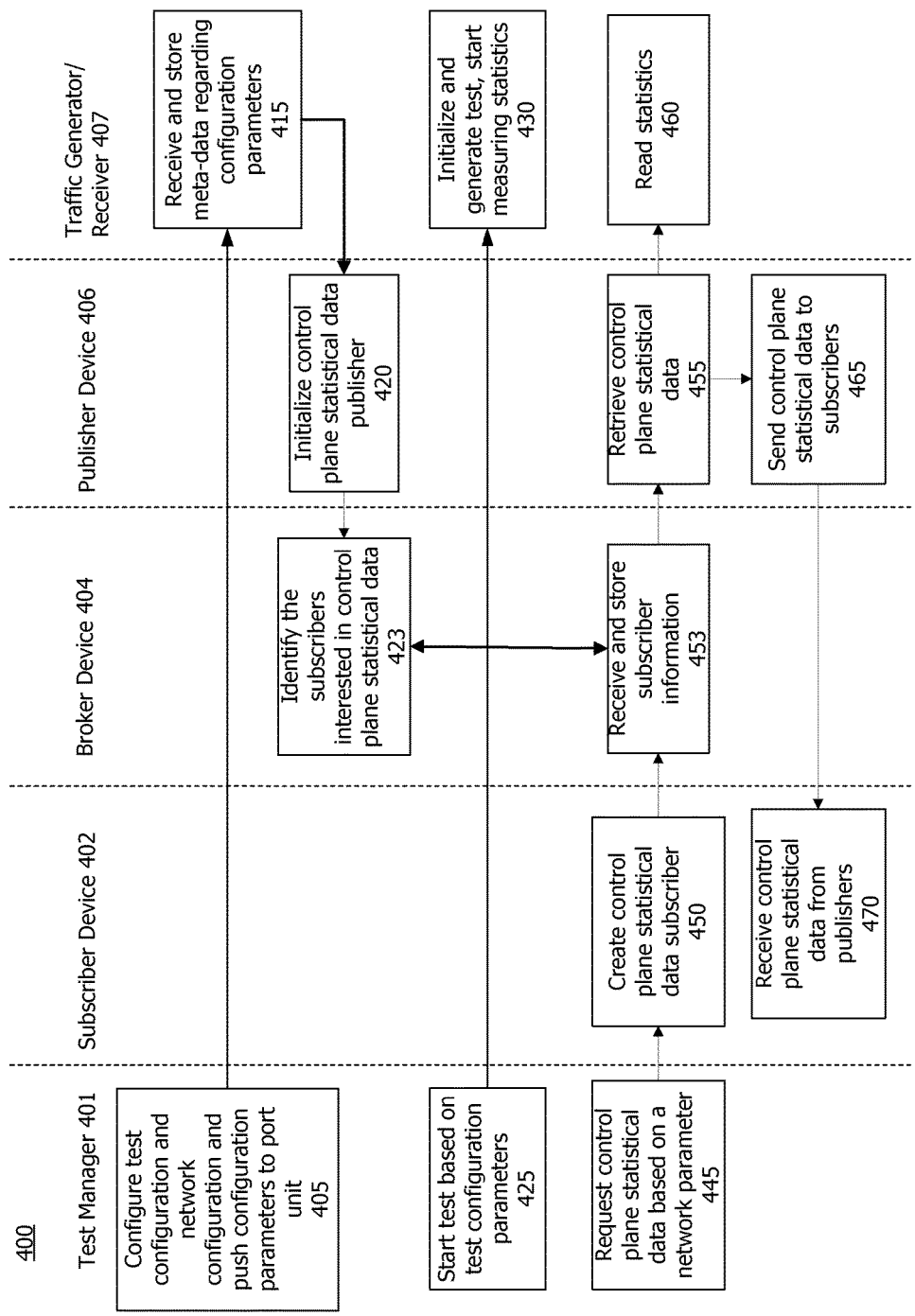
FIG. 4 is a flow chart of a process of acquiring control plane statistical data.

Referring now to FIG. 4, a process 400 of acquiring control plane statistical data is shown and described. The process is described in terms of a test manager 401, a subscriber device 402, a broker device 404, a publisher device 406 and a traffic generator/receiver device 407. The test manager 401 may be the test manager 208 as in FIG. 2. The subscriber device 402 may be the test administrator 205 as in FIG. 2. The broker device may be the chassis 210 as in FIG. 2. The publisher device may be the port unit 220 as in FIG. 2. The traffic generator/receiver device may be the traffic generator and traffic receiver units 240 and 260 on port unit 220 shown in FIG. 2.

While the test manager, test administrator, the chassis, the port units and the traffic generator and traffic receiver units 240 and 260 are capable of performing the respective functions of the test manager, subscriber device, broker device, publisher device, and the traffic generator/receiver device 407, the process 400 is not limited to this network configuration. The process 400 may be executed within a test environment such as that shown in FIG. 1. The process 400 may be performed using a test administrator 205 in conjunction with a chassis 210 and a plurality of port units 220. The process 400 may be used to test a network such as the network 190 and/or a network device such as the network device 192.

The process 400 may include generating a test configuration and a network configuration at 405 on a test manager 401, such as test manager 208 in FIG. 2. The process 400 occurs on five components of the system, namely a test manager 401, a subscriber device 402, a broker device 404, a publisher device 406 and a traffic generator/receiver device 407. In this system, the subscriber device 402 and the publisher device 406 registers with the broker device 404. The subscriber device 402 and the publisher device 406 communicate with each other through broker device 404. As a result of the subscriber device 402 and the publisher device 406 registering with broker device 404, the broker device is aware of where the requests for control plane statistical data are coming from and which publisher might have the requested statistical data.

At 405, an operator may use test manager 401 to configure the network configuration, including the network topology, the device group, the devices in each device group and the protocols and ports being used by the devices. The parameters that define the network configuration will be called the network configuration meta-data. The operator may also configure a test configuration at 405 which is separate from the network configuration. Generating a test configuration may include defining a plurality of ports to be used to test the NUT. Each port may be defined by a set of port attributes describing the hardware and physical layer configuration of the port. Port attributes may include, for each port, identification of the hardware used to implement the port, the physical layer protocol implemented by the port, parameters to be used by the port, and other data. A port unit, such as the port unit 220, may include hardware and software for 50 or more different protocols for data communications, security, network control, and routing. Depending on the nature of the tests to be performed during a test session, each port may typically use only a portion of the total number of protocols within its capability. Generating a test configuration may include defining a subset of the available protocols that will be active at each port. Generating a test configuration at 405 may also include defining the traffic to be generated by the ports while testing the NUT. The test traffic and the data used to define the test traffic may depend on the type of network or device to be tested. For example, test traffic may be defined at 440 in terms of IP datagrams, TCP connections, application layer transaction (e.g. HTTP Put and Get transactions), or emulated user activities, each of which causes some traffic to be generated and transmitted via the NUT.

After the operator has configured the test configuration and network configuration, the configuration parameters are transmitted to the traffic generator/receiver device 407. At 415, the traffic generator/receiver device 407 receives and stores the meta-data information regarding the configuration parameters. The traffic generator/receiver device 407 may generate test traffic based on the test configuration information after the test has been started.

At 420, the publisher device 406 initializes a control plane statistical data publisher to gather data as the test is being performed on the network under test. The publisher may be configured to gather data based on control plane statistical data the operator wishes to see. For example, if the operator selected to see the live sessions, the publisher will collect data including what sessions are up or down. The publisher may also collect protocol-specific data for the devices and any other data regarding the network.

At 423, the broker device 404 identifies the subscribers who are interested in control plane statistical data. The subscriber devices 402 register with the broker device and inform the broker device which control plane statistical data the subscriber device is interested in receiving. After the control plane statistical data publisher registers with the broker device, the broker device 404 at 423 identifies the subscriber devices that are interested in receiving that control plane statistical data. After the broker device 404 identifies the subscriber devices that are interested in the control plane statistical data, it receives and stores the subscriber device information at 453.

At 425, an operator uses the test manager 401 to start a test on the network under test based on the test configuration parameters entered during step 405. Once the test is started, the traffic generator/receiver device 407 begins initializing and generating the test and starts measuring statistics at 430.

At 445, an operator uses the test manager 401 to request control plane statistical data based on a network parameter. For example, an operator may request to see all of the live sessions on the network topology.

Once the operator defines the network parameters for the control plane statistical data, the subscriber device 402 creates a control plane statistical data subscriber at 450. The subscriber is created to inform the broker device that the subscriber device is requesting certain control plane statistical data. In the example above, when the operator requests to see all of the live sessions on the network topology, a subscriber device creates a subscriber that will register with a broker device to request the live session's information on the network topology.

At 453, once the subscriber has been created at 450, the broker device 404 receives and stores the subscriber information. After the subscriber is created, the subscriber registers with the broker device 404, and the broker device 404 stores the subscriber's information so the broker device knows which subscribers want which control plane statistical data.

After the broker device receives and stores the subscriber information at 453, the publisher device 406 retrieves the control plane statistical data at 455. The broker device 404 will identify the publishers that have the data and send a request for the requested control plane statistical data. The broker device 404 will send a request to the appropriate publisher devices 406 to retrieve the control plane statistical data requested. At 460, the traffic generator/receiver device 407 reads the control plane statistical data statistics.

At 465, the publisher device 465 sends the control plane statistical data to the subscribers. In the earlier example, the publisher device 465 would send the control plane statistical data to the subscribers requesting data regarding the live sessions on the network topology.

At 470, the subscriber device 402 receives the control plane statistical data from the broker device. The subscriber device 402, now has all of the control plane statistical data for the network parameter that it requested the data for. The subscriber device 402 can now aggregate and filter the data based on user parameters. Aggregating and filtering the data is discussed in FIG. 5.

Figure 5:
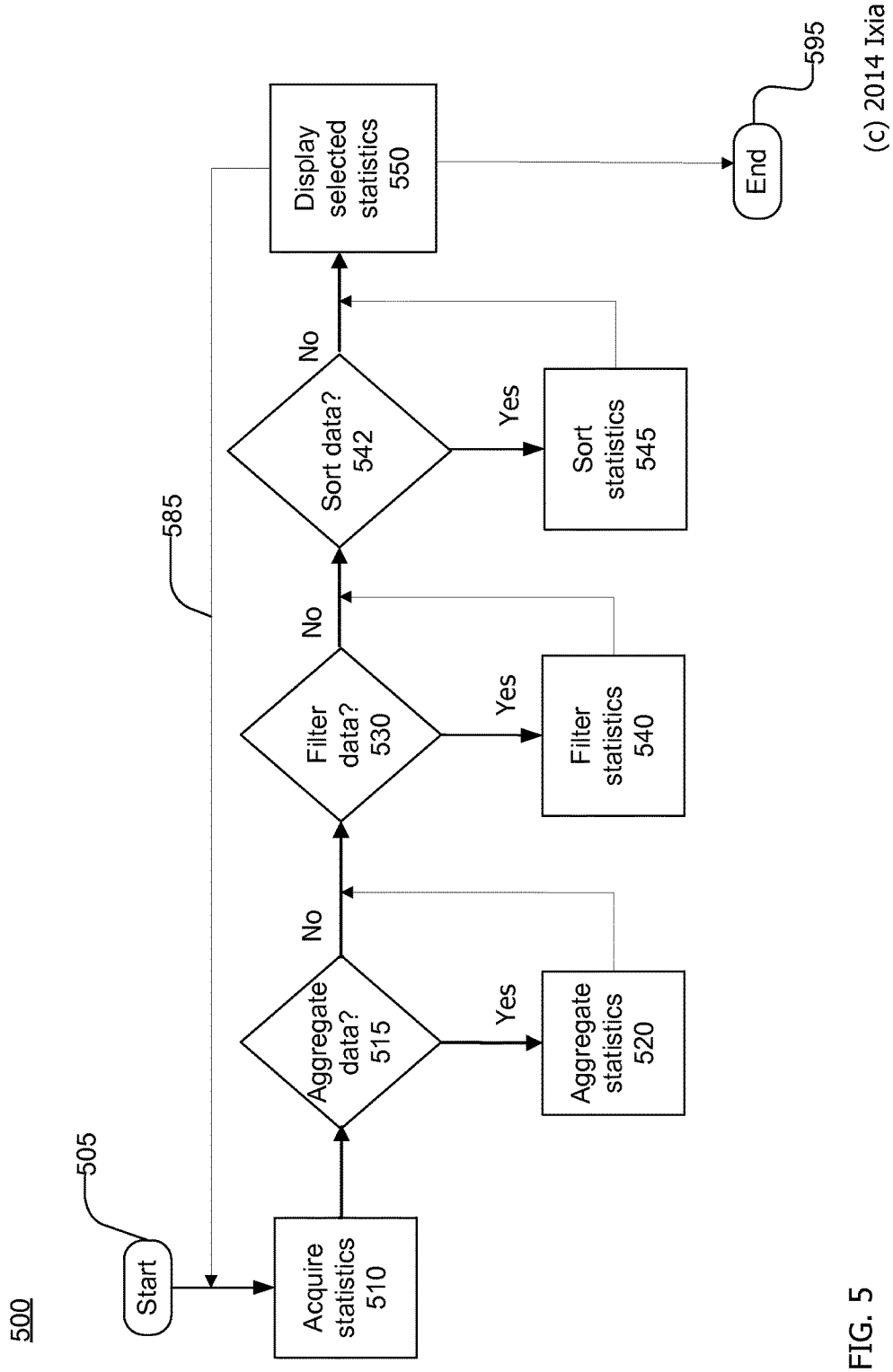
FIG. 5 is a flow chart of a process for filtering and displaying the control plane statistical data.

Referring now to FIG. 5, a process 500 for displaying and viewing control plane statistics in near-real time may start at 505, which may be coincident with the start of a test session, and may end at 595 when the test session has been completed. For ease of description, these actions are shown to be sequential in FIG. 5. However, these actions may be performed, to at least some extent, concurrently. Although shown in FIG. 5 as a sequence of serial actions for ease of description, the process 500 may be performed in a pipeline manner, such that the actions at 510, 515, 520, 530, 540, 542, 545 and/or 550 may be perform at least partially in parallel.

The process 500 is cyclic in nature and the actions from 510 to 550 may be repeated at periodic intervals such as every few seconds.

The process 500 may be performed by a statistics displaying manager operating in conjunction with a graphical user interface on a computing device. The process 500 may be performed, for example, by the statistics displaying manager 209, the graphical user interface 206, operating on the test administrator 205 of FIG. 2.

The process 500 begins after the subscriber device, such as subscriber device 402 in FIG. 4, has retrieved all of the control plane statistical data. At 510, the subscriber device 402 has acquired all of the statistical data. At 515, it is determined whether the test operator has requested to aggregate the data. If the test operator has requested to aggregate the data, then at 520, the process proceeds with the subscriber device aggregating all of the statistical data. For example, the test operator may select to aggregate the data for the whole network topology. In that case, the test operator may see the control plane statistical data for the whole network topology. If it is determined that the test operator has not requested to aggregate the data, then the process proceeds to 530.

At 530, it is determined whether the test operator has requested to filter the statistical data based on certain control plane statistical meta-data. For example, if the test operator only wants to see the session related information for the devices in a certain device group, then the subscriber device will perform a query on the data to only return results for the devices in a certain device group. Similarly, the test operator may only select to see the control plane statistical data for a particular port within a device group, or may select to see the control plane statistical data for a particular protocol.

If the test operator has requested to filter the statistical data, then the process proceeds to 540 to filter the statistical data.

Once the test operator has received all of the statistical data from the broker module, the statistics displaying manager can filter the data. At 540, the statistics displaying manager of the test administrator filters the control plane statistical data according to the test operator's request. Here, the test operator can drill down to any level of granularity. The test operator can view the control plane statistical data for a topology, or for a specific device group, or for a particular port, or for a particular protocol. The statistics displaying manager filters the data based on the test operator's request. This filtering can occur by performing a query, such as an SQL query, on all of the accumulated data. The control plane statistics that was acquired from each port units, includes meta-data identifying the topology, the device group, the port and the protocol for which the data applies to. Therefore, once the statistics displaying manager has acquired all of the data, the statistics displaying manager can perform a query and limit the results to the test operator's request. For example, the test operator can select to view the control plane statistics for all devices in the network topology that are using IPv4. In addition, the test operator can request to view data based on conditional information. For example, the test operator can request to view the control plane statistics based on certain conditions. For example, the test operator can specify that he wishes to view the control plane statistical data for sessions that will perform some upcoming action. Further, the test operator can request to view the session specific statistics. That is, the test operator can request to see all the data for all sessions on the network topology that are up, or all the sessions that are down. Therefore, the test operator can query the aggregated control plane data and drill down into any area of the network to view the statistical data and see how the network is performing.

If the test operator has not requested to filter the statistical data, the process proceeds to 542. After the data is filtered, or not filtered, the process proceeds to 542.

At 542, it is determined whether the test operator has requested to sort the data. For example, if the test operator wants to see data for various protocols, then the data may be sorted based on each protocol-specific statistical data. If the test operator requests to sort the data, then the process proceeds to 545 to sort the statistical data.

After the data has been sorted at 545 or not sorted at 540, the process proceeds to 550 to display the selected statistics to the test operator. The process ends by displaying the control plane statistical data that the user requested. The data is typically displayed on an operator interface 204 such as the operator interface shown in FIG. 2.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus for displaying and viewing control plane statistics, comprising:
   a computer readable storage medium storing instructions that, when executed, cause a computing device to perform a process, comprising:
      configuring a network configuration and a test configuration, wherein the network configuration comprises a network topology, a device group, and a plurality of devices in the device group, and a set of protocols and a port that is being used by the plurality of devices, and wherein the test configuration defines a plurality of ports to be used to test a network under test, and wherein each port of the plurality of ports comprises a traffic generator/receiver device, and wherein the test configuration includes defining the traffic to be generated while testing the network under test
      requesting to display and view statistical data based on a network configuration parameter, wherein the network configuration parameter identifies a component of the network configuration, and wherein acquiring the statistical data comprises:
         transmitting the network configuration parameter to a traffic generator/receiver device, wherein the traffic generator/receiver device generates a test based on the test configuration;
         creating a control plane data statistical data subscriber on a subscriber device and registering the control plane data statistical data subscriber with a broker device, wherein the subscriber device is separate from the broker device, and transmitting subscriber information to the broker device, wherein the subscriber information includes the network configuration parameter that informs the broker device the control plane statistical data the subscriber is interested in receiving,
         storing the subscriber information on the broker device
         creating a control plane statistical data publisher on a publisher device to gather data as the test is being performed on the network under test, and registering the control plane statistical data publisher with the broker device, wherein the broker device comprises a publisher device, and
         the broker device identifying the control plane statistical data subscriber who is interested in the control plane statistical data, and
         the publisher device retrieving the control plane statistical data from the network based on the network configuration parameter, aggregating the statistical data, and transmitting the statistical data to the subscriber device for display of the statistical data on the subscriber device according to the network configuration parameter.

2. The apparatus of claim 1, wherein the network configuration parameter comprises a device group.

3. The apparatus of claim 1, wherein the network configuration parameter comprises information regarding a session on the network topology that is up.

4. The apparatus of claim 1, wherein the network topology comprises two device groups.

5. The apparatus of claim 1 wherein the control plane statistical data is displayed for all of the network topology.

6. The apparatus of claim 1, wherein the control plane statistical data is filtered based on a second port on the device.

7. A method of displaying and viewing control plane statistics, comprising:

configuring a network configuration and a test configuration, wherein the network configuration comprises a network topology, a device group, and a plurality of devices in the device group, and a set of protocols and a port that is being used by the plurality of devices, and and wherein the test configuration defines a plurality of ports to be used to test a network under test, and wherein each port of the plurality of ports comprises a traffic generator/receiver device, and wherein the test configuration includes defining the traffic to be generated while testing the network under test requesting to display and view statistical data based on a network configuration parameter, wherein the network configuration parameter identifies a component of the network configuration, and wherein acquiring the statistical data comprises:

transmitting the network configuration parameter to a traffic generator/receiver device, wherein the traffic generator/receiver device generates a test based on the test configuration;

creating a control plane data statistical data subscriber on a subscriber device and registering the control plane data statistical data subscriber with a broker device, wherein the subscriber device is separate from the broker device, and transmitting subscriber information to the broker device, wherein the subscriber information includes the network configuration parameter that informs the broker device the control plane statistical data the subscriber is interested in receiving, storing the subscriber information on the broker device creating a control plane statistical data publisher on a publisher device to gather data as the test is being performed on the network under test, and registering the control plane statistical data publisher with the broker device, wherein the broker device comprises a publisher device, and the broker device identifying the control plane statistical data subscriber who is interested in the control plane statistical data, and the publisher device retrieving the control plane statistical data from the network based on the network configuration parameter, aggregating the statistical data, and transmitting the statistical data to the subscriber device from the publisher device displaying the statistical data according to the network configuration parameter.

8. The method of claim 7, wherein the network configuration parameter comprises a device group.

9. The method of claim 7, wherein the network configuration parameter comprises information regarding a session on the network that is up.

10. The method of claim 7, wherein the network topology comprises two device groups.

11. The method of claim 7, wherein the control plane statistical data is displayed for the whole network topology.

12. The method of claim 7, wherein the control plane statistical data is filtered based on a port on a device.

* * * * *